United States Patent Office
2,757,208
Patented July 31, 1956

2,757,208

SOLID 1-ALLYLOXY-2,4,6-TRIMETHYLOL-BENZENE

Charles A. Burkhard, Alplaus, N. Y., assignor to General Electric Company, a corporation of New York No Drawing. Application July 30, 1953,
Serial No. 371,401

1 Claim. (Cl. 260—613)

This invention is concerned with a novel composition of matter and more particularly relates to pure solid 1-allyloxy-2,4,6-trimethylolbenzene.

In U. S. Patent 2,579,330 issued December 18, 1951, the chemical compound 1-allyloxy-2,4,6-trimethylolbenzene (hereinafter for brevity referred to as "allyl ether") having the formula

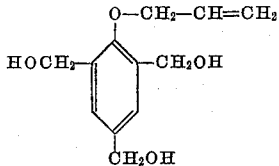

is described as being a liquid composition. Unexpectedly, I have discovered that instead of being liquid, pure 1-allyloxy-2,4,6-trimethylolbenzene is a solid, crystalline product having a definite melting point at room temperature (about 25° C.). It was found that the liquid state previously attributed to the allyl ether in the above-mentioned patent was apparently due to slight impurities which prevented satisfactory crystallization and isolation of the solid product.

In order that those skilled in the art may better understand how to prepare this pure, solid 1-allyloxy-2,4,6-trimethylolbenzene, the following example is given by way of illustration.

*Example*

Into a two-liter flask equipped with stirrer, reflux condenser, thermometer, and an inlet tube for nitrogen was placed 188 grams phenol. To this was added with stirring a solution of 90 grams of sodium hydroxide and 70 grams of water. The mixture was then allowed to solidify, in the absence of stirring, by cooling it with a cold-water bath. Thereafter, 588 grams of commercial formaldehyde solution (approximately 37 per cent formaldehyde) were added. After the sodium phenate had dissolved, the reaction mixture started to become warm. To counteract this, the temperature was reduced to below 45° C. by re-immersing the reaction flask in a cold-water bath. The reaction mixture was then stirred for about 48 hours while maintaining a nitrogen atmosphere over it. The sodium salt of 2,4,6-trimethylolphenol was thereafter precipitated by pouring the reaction mixture into three liters of isopropyl alcohol. After three hours, the precipitate was separated by filtration and dried in a vacuum desiccator for about 15 hours to give 390 grams of the sodium salt.

A mixture composed of 500 ml. acetone, 120 grams allyl bromide, 200 grams of the above-prepared sodium trimethylolphenate, and 40 grams of potassium carbonate was heated at the reflux temperature of the mass with stirring for about seven hours. The precipitated salts thus formed were removed by filtration, and the acetone and excess allyl bromide removed by evaporation under reduced pressure. There was thus obtained about 148.4 grams of impure 1-allyloxy-2,4,6-trimethylolzenzene.

This impure compound was then converted to a derivative of the 1-allyloxy-2,4,6-trimethylolbenzene and subsequently decomposed to give pure, solid 1-allyloxy-2,4,6-trimethylolbenzene, as follows: 25 grams of the above impure allyl ether described in the example were dissolved in 150 ml. dry pyridine and thereafter 75 grams of trimethylchlorosilane were added dropwise with stirring at a temperature below 45° C. After completion of the reaction the pyridine hydrochloride was removed by filtration and the filtrate was distilled to remove excess pyridine and trimethylchlorosilane. A second filtration was found necessary, since additional pyridine hydrochloride precipitated on distillation. By a rapid stripping operation two fractions were obtained, one boiling below 140° C. at 1 mm., and one boiling above 140° C. which had an $n_D^{20}$ value of 1.4723. Rectification of a portion of the fraction boiling above 140° C. in turn gave two fractions, one boiling at 72–140° C. at 1 mm., and a second fraction boiling at 145° C. at 1 mm. and having an $n_D^{20}$ value of 1.4700. Analysis of the second fraction showed it to contain 57.1 per cent carbon, 8.9 per cent hydrogen and 18.6 per cent silicon, the molecular weight was found to be 421 using benzene as the cryoscopic solvent. This composition was identified as being 1-allyloxy-2,4,6-tristrimethylsiloxy-methylbenzene having the formula

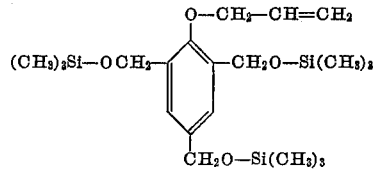

as evidenced by the fact that the theoretical values for the above elements were: carbon 57.23 per cent, hydrogen 9.15 per cent, silicon 19.10 per cent, and molecular weight 440. An infrared absorption spectrum for this product indicated that the trimethylsilyl derivative was actually obtained.

About 50 parts of the 1-allyloxy-2,4,6-tristrimethylsiloxymethylbenzene was hydrolyzed by adding it to a homogeneous solution of 300 parts water and about 554 parts methanol. An exothermic reaction developed after which the solution was heated at its boiling point for about 2 minutes. The excess water, methanol and hexamethyldisiloxane resulting from the reaction were removed on a vacuum train. After evaporation, a viscous liquid remained having an $n_D^{20}$ of 1.5603 which crystallized on standing at 10° C. Recrystallization of the crystals from ethyl acetate gave a white crystalline product having a melting point of 85–86° C. Further purification and recrystallization from ethyl acetate gave a colorless, crystalline, solid melting at 86.0–86.2° C. This allyl ether is soluble in water, dioxane and ethyl acetate, and has a rod-like crystalline structure. Analysis of this compound showed it to be pure 1-allyloxy-2,4,6-trimethylolbenzene as evidenced by the fact that it was found to contain 64.6 per cent carbon, 7.4 per cent hydrogen, had a molecular weight of 206 (in dioxane), and a hydroxyl equivalent of 74.3 (theoretical values are carbon 64.27 per cent, hydrogen 7.19 per cent, molecular weight 224, hydroxy equivalent 74.7). An infrared absorption spectrum verified the fact that this material was essentially pure crystalline 1-allyloxy-2,4,6-trimethylolbenzene.

This pure material has utility in many applications including the same ones in which the impure liquid 1-allyloxy-2,4,6-trimethylolbenzene described in the above-mentioned U. S. Patent 2,579,330 may be used. Being a pure product, this allyl ether may be used as a polyhydric alcohol the same way that glycerine is employed in making polyesters by effecting reaction between the allyl ether and polycarboxylic acids such as phthalic acid or anhydride, maleic acid or anhydride, sebacic acid, etc., either alone or modified by various oils including drying oils, semi-drying oils, non-drying oils, fatty oil acids, etc. to give resins which are highly useful in coating applications. The allyl ether can also be esterified with various monocarboxylic acids to make plasticizers useful in combination with vinyl halide resins, for instance, polyvinyl chloride, copolymers of vinyl chloride and vinyl acetate, etc.

If desired, the above-described allyl ether may be intercondensed with itself by employing small amounts of acidic catalysts such as para-toluene sulfonic acid, paraphenol sulfonic acid, ethyl hydrogen sulfate, etc. Before condensing the material it may be desirable to form a molding composition by dissolving the allyl ether in a suitable solvent as, for instance, amyl alcohol, ethyl acetate, etc., add the acidic condensing agent, and suitable fillers, and thereafter evaporate the solvent. Solutions of the allyl ether may be employed to coat and impregnate various sheet materials including paper, canvas, glass cloth, etc. which can thereafter be dried, superimposed upon each other and heated under pressure to give laminated panels of good heat resistance and having the additional property of being extremely caustic-resistant. Molded products, e. g., cups, saucers, wash tubs, etc., prepared from fillers coated and impregnated with the allyl ether and thereafter heat-treated to effect condensation of the methylol groups will be found to be strong and resistant to various chemicals, particularly caustic materials.

What I claim as new and desire to secure by Letters Patent of the United States is:

The process for making solid, crystalline 1-allyloxy-2,4,6-trimethylolbenzene melting at 86.0–86.2° C. which comprises (1) interacting formaldehyde and phenol in an aqueous medium employing sodium hydroxide as the condensing agent to obtain a sodium methylol phenate mixture containing the sodium salt of 2,4,6-trimethylolphenol, (2) precipitating the latter trimethylolphenol salt by pouring the reaction mixture into isopropyl alcohol and isolating the precipitated product, (3) reacting the aforesaid sodium salt of 2,4,6-trimethylolphenol with allyl bromide to give a composition containing in impure form 1-allyloxy-2,4,6-trimethylolbenzene, (4) reacting the impure 1-allyloxy-2,4,6-trimethylolbenzene with trimethylchlorosilane to give a reaction mixture containing 1-allyloxy-2,4,6-tristrimethylsiloxymethylbenzene, (5) isolating the 1-allyloxy-2,4,6-tristrimethylsiloxymethylbenzene and hydrolyzing the latter to give a mixture containing 1-allyloxy-2,4,6-trimethylolbenzene which after precipitation and recrystallization from ethyl acetate yields a white crystalline product having a melting point of about 86.0–86.2° C.

References Cited in the file of this patent

UNITED STATES PATENTS

| | | |
|---|---|---|
| 2,579,329 | Martin | Dec. 18, 1951 |
| 2,579,330 | Martin | Dec. 18, 1951 |